United States Patent [19]

Gaillard et al.

[11] Patent Number: 4,545,100

[45] Date of Patent: Oct. 8, 1985

[54] METHOD AND APPARATUS FOR MANUFACTURING VENETIAN BLINDS

[75] Inventors: Adrianus J. C. Gaillard, Zwijndrecht, Netherlands; Richard N. Anderson, Owensboro, Ky.

[73] Assignee: Hunter Douglas International N.V., Willemstad, Netherlands Antilles

[21] Appl. No.: 506,881

[22] Filed: Jun. 24, 1983

[30] Foreign Application Priority Data

Jul. 23, 1982 [GB] United Kingdom ................. 8221426

[51] Int. Cl.⁴ ............................................. B23P 19/04

[52] U.S. Cl. .................................................... 29/24.5

[58] Field of Search ................ 29/412, 24.5, 433, 241; 160/429

[56] References Cited

U.S. PATENT DOCUMENTS 4,073,044 2/1978 Edixhoven ........................... 29/24.5

4,188,693 2/1980 Edixhoven ........................... 29/24.5

*Primary Examiner*—Howard N. Goldberg

*Assistant Examiner*—Steven Nichols

*Attorney, Agent, or Firm*—Pennie & Edmonds

[57] ABSTRACT

A method and apparatus for manufacturing venetian blinds in which at least two ladder tapes, preferably with rungs each consisting of at least two cross cords, are provided, of a sufficient length for a large number of venetian blinds.

The slats are inserted between the cross cords of the ladder tapes to form a substantially continuous mat of slatted ladder tape. The mat is then stored, for example, on a roll or in a container, and is subsequently cut off into individual lengths, each length being suitable for one blind.

9 Claims, 4 Drawing Figures

METHOD AND APPARATUS FOR MANUFACTURING VENETIAN BLINDS

DESCRIPTION

The present invention relates to a method and apparatus for the manufacture of a venetian blind.

The conventional method of manufacturing a venetian blind, on an industrial scale, is to feed slat material from a continuous supply thereof and to cut the material into individual slat lengths. These slat lengths are then fed into at least two ladder tapes consisting of side ladder cords and cross rungs. The rungs are manufactured with a single or multiple cross cord(s), with the slats resting on top of the cross cord(s) and occasionally held in place by a notch in the slat material.

In an alternative construction, the ladder cords consist of side tapes and rungs each formed by a plurality of rung cords. Thus there is, for each rung, at least one lower rung cord and at least one upper rung cord and the slat material is fed between these two.

When this construction has been made for the normal lengths of one specific venetian blind, the one blind/assembly is removed from the apparatus and one can attach it to a headrail and, where appropriate, provide a bottom rail and lift cords, or this is partly or completely done at the assembling machine itself.

Such a method is generally satisfactory for most purposes but it is rather time consuming and therefore expensive, espcially when a considerable number of venetian blinds identical in colour and size is to be made.

It is now proposed, according to a first aspect of the present invention, to provide a method of manufacturing venetian blinds comprising the steps of:

(a) providing at least two ladder tapes of a length sufficient for several venetian blinds;

(b) inserting venetian blind slats into said ladder tape to form a substantially continuous mat of slatted ladder tapes, said continuous mat being of sufficient length for several venetian blinds;

(c) cutting off individual lengths of said mat, each of a length for one blind.

The continuous mat thus formed can be made very long indeed, and can be, for example, a 100 meters or more in length. The mat is then preferably stored prior to cutting off lengths of the mat for individual blinds and this can be done, for example, by winding the mat up into a roll or by stacking into a container. When it is made up into a roll then a layer or strips of protective material, e.g. foam material, can be fed between the convolutions of the mat on its roll.

The roll or container of slats can then be sent to an assembler who can then cut off desired lengths of the mat and do the final steps for manufacturing a venetian blind which may, for example, include providing a headrail, a bottom rail and lift cords or providing other hardware components, dependable on what components, are necessary in certain constructions of blind. Since the mat is manufactured continuously, one does not have to keep stopping and starting its production at the end of manufacture of sufficient slats in the ladder tape for one blind. The final assembly can be carried out readily to suit the particular task. It is contemplated that the mats will be used to manufacture a stock of off the shelf blinds rather than "tailor made" blinds, these stock blinds being intended for standard window sizes. The method of the present invention is particularly suitable for making very small blinds i.e. with very small slat widths which may be used in double or triple glazing.

Thus, the invention provides a method of manufacturing venetian blinds comprising the steps of:

(a) providing at least two ladder tapes with the rungs each consisting of at least two cross cords, the ladder tapes being of sufficient length for several venetian blinds;

(b) inserting venetian blind slats between the cross cords of the ladder tapes, to form a substantially continuous mat of slatted ladder tape, the spacing between the side tapes of the ladder tape and between the cross cords of the rungs relative to the width and thickness respectively of the venetian blind slat material, being sufficiently small to retain the slats in place in the mat;

(c) cutting off individual lengths of said mat, each of a length for one blind.

The mat produced by such a method will be capable of retaining the slats in position so that they cannot readily accidentally be moved.

According to a further aspect of the present invention there is provided, for use in the manufacture of several venetian blinds, a continuous mat comprising at least two ladder tapes with the rungs of each tape consisting of at least two cross cords and slats inserted between the cords of each said rung of each ladder tape, the continuous mat of slatted ladder tape being sufficiently long for several venetian blinds and the spacing between the side tapes of the ladder tape and between the cross cords of the rungs relative to the width and thickness respectively of the venetian blind slat material being sufficiently small to retain the slats in place in the mat.

According to a still further aspect of the invention there is provided apparatus for use in the manufacture of venetian blinds, said apparatus comprising means for advancing at least two venetian blind ladder tapes, parallel to one another, a unit for positioning the ladder tapes in order to feed the slats to the blind between cords of the rungs, means to feed slat material between the cords of the rungs of the ladder tape positioned by said unit and means further to advance the continuous mat of standard ladder tapes thus formed to a store facility.

In such an apparatus the means to further advance the continuous mat may comprise a roll onto which the mat is led and means to rotate the roll. The roll may, for example, be mounted on a trolley and have a dog clutch releasably engageable with a similar clutch on a motor. When a sufficient length of mat has been wound onto the roll, the trolley may then be moved away and replaced. The roll itself may constitute the store facility for the continuous mat or it may feed the mat onto a container which may itself be placed in a carton or form the carton itself.

Advantageously, the sensing mechanism is actuatable after a certain number of slats have been positioned between the respective cords of the rungs to operate the means to further advance the continuous slat.

According to the two widely used standard assembling systems that are both suitable for use with the method and apparatus of the invention, the slat material can be fed either as individual independant slats or as continuous slat strips to be cut off at the required length after insertion into the ladder tapes.

In order that the present invention may more readily be understood, the following description is given, merely by way of example, reference being made to the accompanying drawings, in which.

Figure 1:
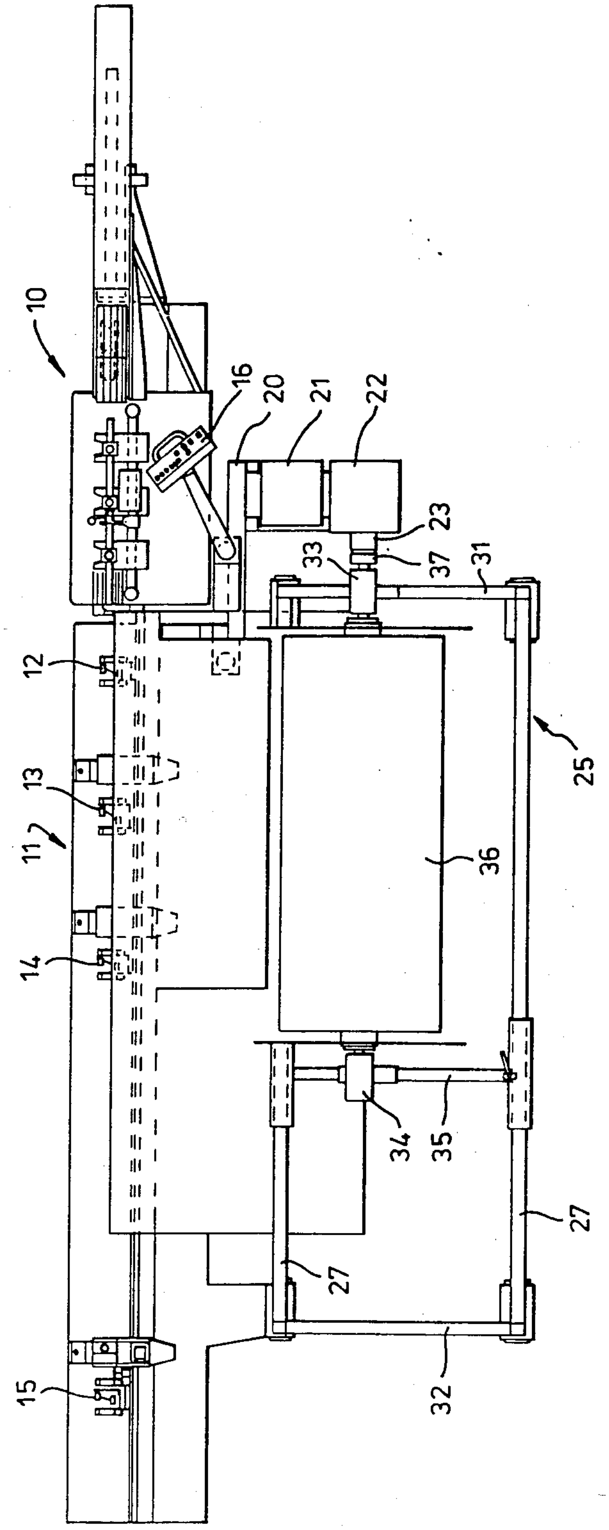
FIG. 1 is a top view of one embodiment of apparatus according to the invention.

Referring first to FIG. 1 there is illustrated schematically an arrangement indicated by the general reference numeral 10 for feeding slat material fowardly, that is from right to left as seen in FIG. 1. This material is straightened in this device and fed forwardly and cut to length. Mounted adjacent the device 10, is an assembly 11 for feeding the slats into ladder tapes which have been indicated generally by the reference numerals 12, 13 and 14. These ladder tapes are preferably each of the type which includes a pair of spaced apart vertically extending side cords and a plurality of rungs, each rung consisting of at least two cross cords. There will normally be an upper and a lower cross cord for each rung, but there may be two upper and two lower cords if desired.

It will be noted that the assembly 11 also includes another ladder tape station 15 and this would be used when one is constructing a very wide venetian blind. There would then, of course, probably be additional intermediate ladder tapes. A console 16 is indicated to control the operation of the parts so far described.

Mounted adjacent the device 10 is a support frame 20 on which is mounted a motor 21, a gear box 22 driven thereby, the output to the gear box being in the form of a dog clutch 23.

The drawings illustrate a carriage 25 having wheels 26 enabling it to be brought up adjacent the assembly 11 and the frame 20. The carriage includes lower and upper longitudinal members 27, 28 respectively, upright members 29, 30 and cross members 31, 32.

At the upper end of the upright member 29, there is provided a bearing 33 and a similar bearing 34 is mounted on a support 35 which is positionable at various axial locations along the upper longitudinal members 28.

Figure 2:
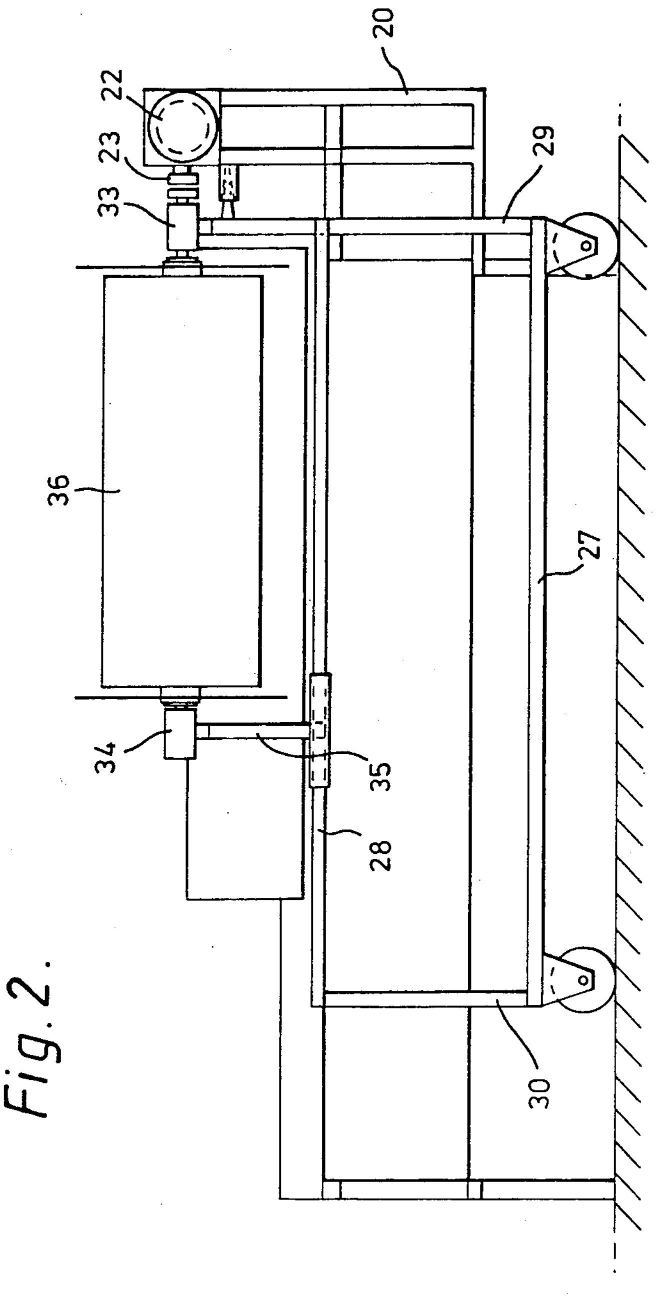
FIG. 2 is a rear elevation of a portion of the apparatus of FIG. 1.

Between the two bearings there is mounted a roll 36 with stub shafts (unreferenced) at each end, the stub shaft on the right, as viewed in FIGS. 1 and 2, including a further dog clutch 37 engageable with the dog clutch 23 on the motor.

With the roll installed in the manner indicated and with the dog clutches 23, 37 in interengagement, the slats are fed into the ladder tapes 12, 13, 14 in a perfectly conventional manner, for example as described in British Patent No. 1,582,175, and a stack 40 (see FIG. 3) of slatted ladder tape is formed. Adjacent this stack are two sensors 41 and 42 which sense when the stack has been formed. The moment the stack is formed a signal is sent to the motor 20 which, via the gear box 22, and the dog clutches 23, 37, causes the roll 36 to be rotated forward by a certain amount. This will then draw the stack 40 onto the roll and a substantially continuous roll of slatted ladder tapes is formed. This may be very long indeed, for example a 100 meters or more.

Figure 3:
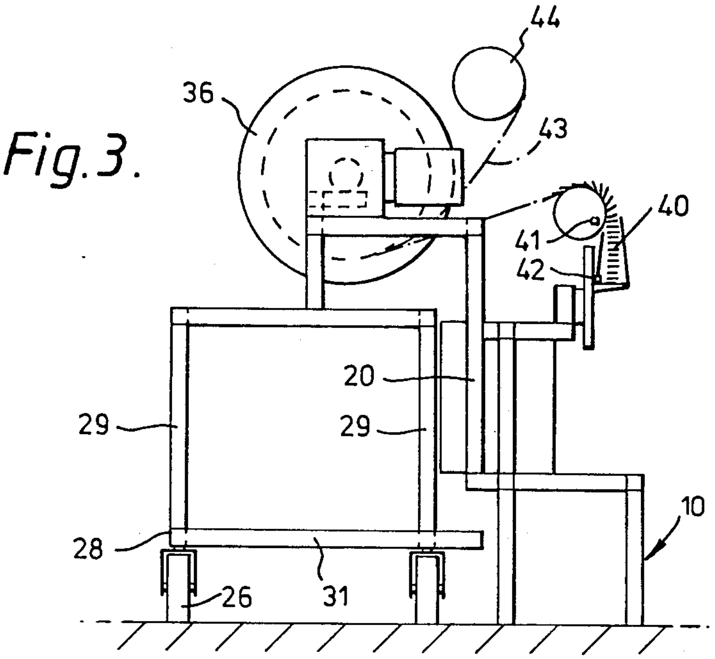
FIG. 3 is a side elevation of the apparatus of FIGS. 1 and 2.

Preferably, a protective material, such as a foam material 43 is fed in between the convolutions from a supply roller 34 thereof (FIG. 3).

When the roll 36 is considered full, the apparatus can be stopped and the trolley moved away and the roll kept in store or sent on for further processing. This further processing would involve cutting off the desired length for a particular venetian blind and doing such further work on this length as is necessary to make the venetian blind, for example, adding a headrail and/or a bottom rail when these are deemed necessary.

Figure 4:
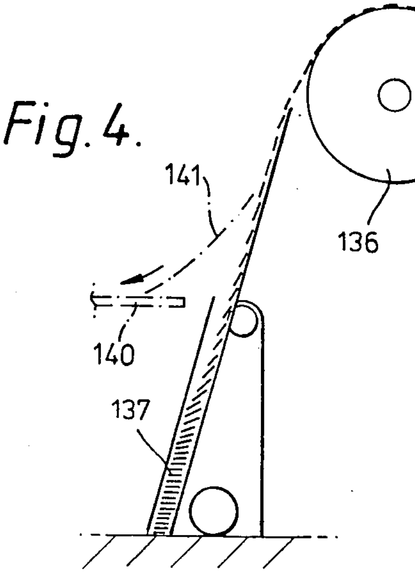
FIG. 4 is a schematic side elevation of a second embodiment of apparatus.

An alternative arrangement is illustrated in FIG. 4 in which, instead of having a trolley with a roll on it, the slatted ladder tape is fed over the roller 136 and directly into a container 137 which may, for example, either be a carton for forwarding the slatted continuous mat on or it may be a temporary retaining device, for example, a pair of elongate forks, and the device is then inserted in a carton for further transport. Instead of feeding the continuous mat of slatted ladder tapes into the container 137, one can feed the mat onto a table 140 as indicated in phantom at 141, cut off the desired length for an individual blind and complete the assembly operation of the blind on the table. While this is being done the mat will continue to feed into the container and the operator can then pull back the mat and cut off another length and so on. During any break in the operation of assembly, the mat will continue to be fed into the container 137.

We claim:

1. A method of manufacturing venetian blinds comprising the steps of:

(a) providing at least two ladder tapes of a length sufficient for several venetian blinds;

(b) inserting venetian blind slats into said ladder tapes to form a substantially continuous mat of slatted ladder tapes, said continuous mat being of sufficient length for several venetian blinds;

(c) storing the mat of slatted ladder tapes; and (d) subsequently cutting individual lengths of said mat, each of a length for one blind.

2. A method of manufacturing venetian blinds comprising the steps of:

(a) providing at least two ladder tapes with the rungs of each consisting of at least two cross cords, the ladder tapes being of sufficient length for several venetian blinds;

(b) inserting venetian blind slats between the cross cords of the ladder tapes to form a substantially continuous mat of slatted ladder tapes, the spacing between the side tapes of the ladder tapes and between the cross cords of the rungs relative to the width and thickness respectively of the venetian blind material being sufficiently small to retain the slats in place in the mat;

(c) storing the mat of slatted ladder tapes; and (d) subsequently cutting off individual lengths of said mat, each of a length for one blind.

3. A method according to either of claim 1 or 2 wherein the mat is stored by stacking it in a container.

4. A method according to claim 1 or 2, wherein the mat is stored by winding it onto a roll.

5. A method of manufacturing venetian blinds comprising the steps of:

(a) advancing at least two venetian blind ladder tapes parallel to one another;

(b) positioning the ladder tapes in order to feed slats through the ladder tapes between individual rungs of a pair of rungs;

(c) feeding slats between said individual rungs of a pair of rungs to form slatted ladder tapes; and (d) advancing a continuous mat of the slatted ladder tapes thus formed to a storage facility.

6. A method according to claim 5 wherein the step of advancing the continuous mat includes rolling the mat onto a roll and the additional step of rotating said roll.

7. A method according to claim 6 wherein said mat is rolled upon itself on said roll and said roll comprises said storage facility.

8. A method according to claim 6 including the additional step of feeding said mat from said roll into a container.

9. A method according to claim 5 wherein the step of advancing said continuous mat to a storage facility occurs after a predetermined number of slats have been positioned in individual rungs of a pair of rungs.

* * * * *